United States Patent
Fong et al.

(10) Patent No.: US 7,743,343 B2
(45) Date of Patent: Jun. 22, 2010

(54) COMBINED REPRESENTATION OF A HIERARCHICAL DATA ITEM COLLECTION

(75) Inventors: Jeffrey C. Fong, Seattle, WA (US); Julian Leonhard Selman, Redmond, WA (US); Marc S. Doll, Seattle, WA (US); Thamer A. Abanami, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 11/265,455

(22) Filed: Nov. 1, 2005

(65) Prior Publication Data

US 2007/0101294 A1    May 3, 2007

(51) Int. Cl.
*G06F 3/048* (2006.01)
*G06F 7/00* (2006.01)
*G06F 17/30* (2006.01)

(52) U.S. Cl. .......................... 715/841; 715/838; 707/3
(58) Field of Classification Search ................. 715/841, 715/838; 707/3
See application file for complete search history.

(56) References Cited

U.S. PATENT DOCUMENTS

| | | | | |
|---|---|---|---|---|
| 4,714,918 A | * | 12/1987 | Barker et al. ................. | 345/684 |
| 6,073,137 A | * | 6/2000 | Brown et al. .............. | 707/104.1 |
| 6,335,742 B1 | * | 1/2002 | Takemoto .................... | 715/781 |
| 2001/0026289 A1 | * | 10/2001 | Sugiyama et al. ............ | 345/804 |
| 2001/0047406 A1 | * | 11/2001 | Araujo et al. ................ | 709/223 |
| 2002/0003548 A1 | * | 1/2002 | Krusche et al. .............. | 345/736 |
| 2004/0001107 A1 | * | 1/2004 | Russon ........................ | 345/838 |
| 2004/0056883 A1 | * | 3/2004 | Wierowski ................... | 345/719 |
| 2004/0189707 A1 | * | 9/2004 | Moore et al. ................. | 345/777 |
| 2005/0097475 A1 | * | 5/2005 | Makioka et al. ............. | 715/792 |
| 2005/0234896 A1 | * | 10/2005 | Shima et al. .................... | 707/3 |
| 2006/0031211 A1 | * | 2/2006 | Mizuno ........................... | 707/3 |
| 2006/0107207 A1 | * | 5/2006 | Wada .......................... | 715/526 |

* cited by examiner

*Primary Examiner*—Joshua D Campbell
*Assistant Examiner*—Stephen Alvesteffer
(74) *Attorney, Agent, or Firm*—Woodcock Washburn LLP

(57) ABSTRACT

A hierarchical system is used to store data items easily capable of thumbnail representation (such as images). Such a hierarchical system may allow a folder (or other grouping) to contain both data items and sub-folders. The display of such a folder uses two display areas. In one display area, sub-folders are displayed using a list view, where text is the primary method for the display of the sub-folders which are contained in the folder. In the other display area, a grid view is used to display the data items. Thumbnail images are the primary components of the grid view. Functionality available to a user will change based on whether the user is browsing the list view or the grid view.

18 Claims, 5 Drawing Sheets

COMBINED REPRESENTATION OF A HIERARCHICAL DATA ITEM COLLECTION

BACKGROUND

Mobile devices can store a collection of data items, such as images. For example, cameras and cell phones including camera functionality may store images captured using the camera or camera functionality. The user of such a device often is provided with a view of the collection. Additionally, many other systems which store or access collections of images provide a user with a view of a collection.

At the present time, there are several ways to provide a user with a display of all or part of a collection of data items such as images. One way is to use a list view. The list view lists items in the collection. For example, one way to provide a list view of a collection of images is to list the name of each item in the collection, the size of the item, the type of the item, the date and time of the creation of the item, the date and time of the modification of the item, and the location of the item. This allows a user to see and sort on many pieces of information related to the items in the collection. However, the list view does not allow a user to easily select a specific item in certain cases. For example, if the items are images and the images are not given useful names, and if the user is looking for an image of a specific person, a list view will not provide the user with the ability to easily find the image.

Alternately, a grid view may be used to display the content. A grid view is a display of some or all of the items in a collection which is more graphical than the list view. The grid view provides a number of graphical thumbnails, each representing an item in the collection. For example, a collection including images would represent each image as a graphical thumbnail of the image. In general, in a grid view the thumbnails are arranged in a grid, so that a user can more easily view the items in the collection. Not all of the items may be visible at one time—it may be necessary for the user to scroll or page to view all of the items in a collection.

A grid view allows a user to more quickly find an item which is more quickly identified by a thumbnail than by descriptive information. Thus, a grid view is useful for a collection which includes photographs or images. However, a grid view may not be as useful for switching between displays of collections. If a collection includes several sub-collections, each sub-collection must be selected in order to display the grid view for that sub-collection. Then that selection must be reversed or backed out of, or the original collection selected again in order to view the original collection again, for example to select an alternate sub-collection.

This may be made more difficult if the user input device is simple. For example, where a user input consists of only several keys, selection may be accomplished by navigating to an item in the grid view (through arrow keys, for example) and then highlighting an item in the grid view (through a selection button). Where a user input consists only of a mouse or other pointing device, selection is accomplished by pointing at an item and pressing or clicking a button.

In such cases, where user input devices are minimal, navigation becomes cumbersome. In order to view different collections, the user must select each collection and then back out of the selection. This makes navigating several collections and sub-collections difficult. Additionally different functionality may be required for different items. For example, items which are collections may be opened to view the items in the collection upon mouse click in a grid view. Items which are images may be printed upon a mouse click. In such a case, when navigation proceeds from one item to the next in a view, the functionality provided changes, and this may be confusing for a user.

Thus, there is a need for a system and method to overcome these deficits in the prior art. The present invention addresses the aforementioned needs and solves them with additional advantages as expressed herein.

SUMMARY

A display is provided of collections of items, some of which include data items capable of thumbnail representation. The collections are hierarchical, and a collection may include sub-collections. For example, where a hierarchical foldering system is implemented, folders may include data items and sub-folders.

In order to allow easy navigation through the collections, in one embodiment, a display includes a first display area in which thumbnail representations of data items are displayed. In addition, sub-collection representations of sub-collections (e.g. lower-level folders included in the folder being displayed) are provided in a second display area. These sub-collection representations may include, for example, text (such as the name of the lower-level folder). An icon of a folder and/or other graphics and text may be included in the sub-collection representation.

The functionality which is presented to a user, in one embodiment, changes based on whether a data item or a sub-collection is selected, or whether the first display area or second display area is selected. Sorting, grouping, and filtering actions are supported.

Only some embodiments of the invention have been described in this summary. Other embodiments, advantages and novel features of the invention may become apparent from the following detailed description of the invention when considered in conjunction with the drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 1:
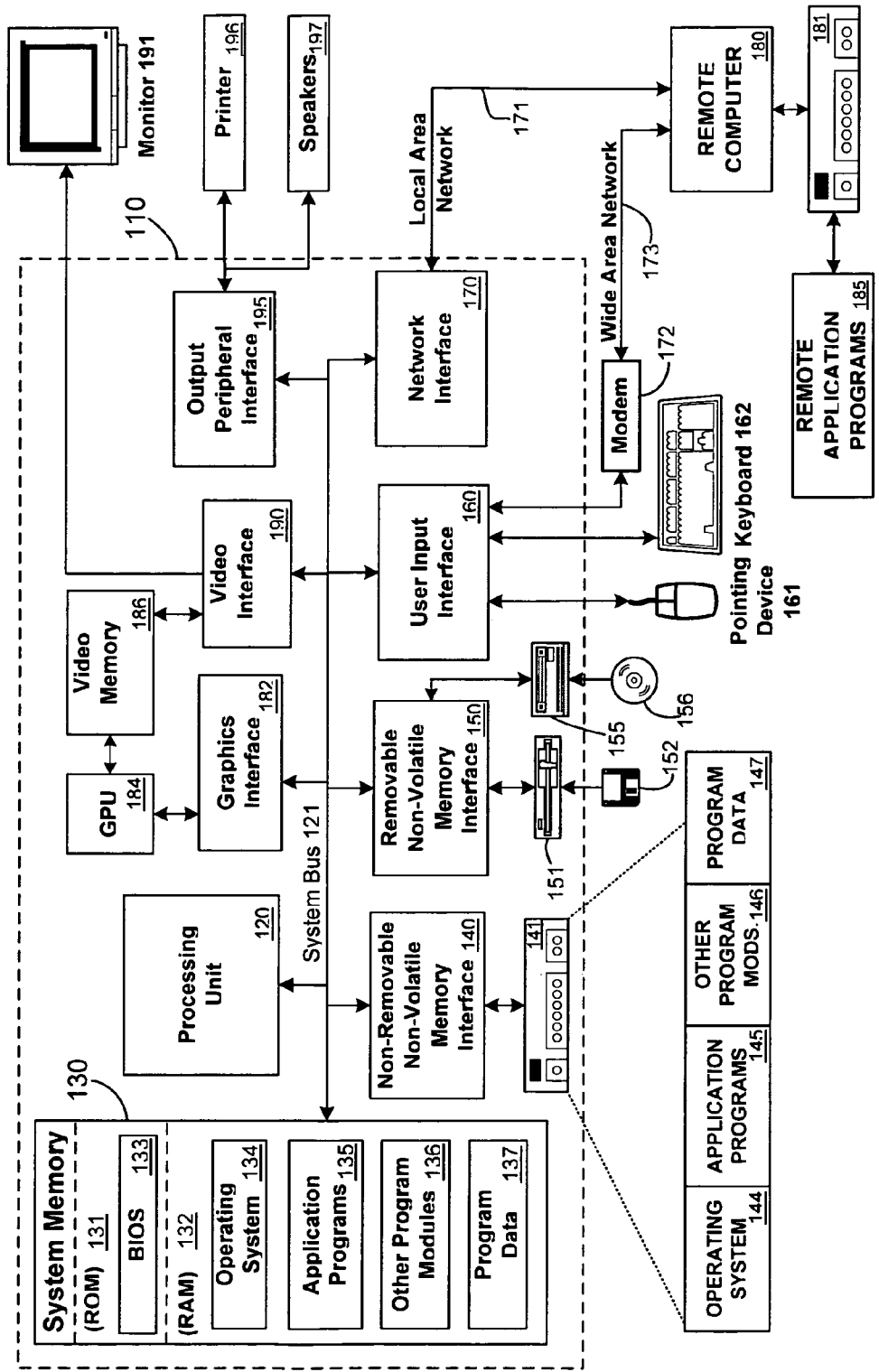
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Combined Representation of a Hierarchical Data Item Collection

Figure 2:
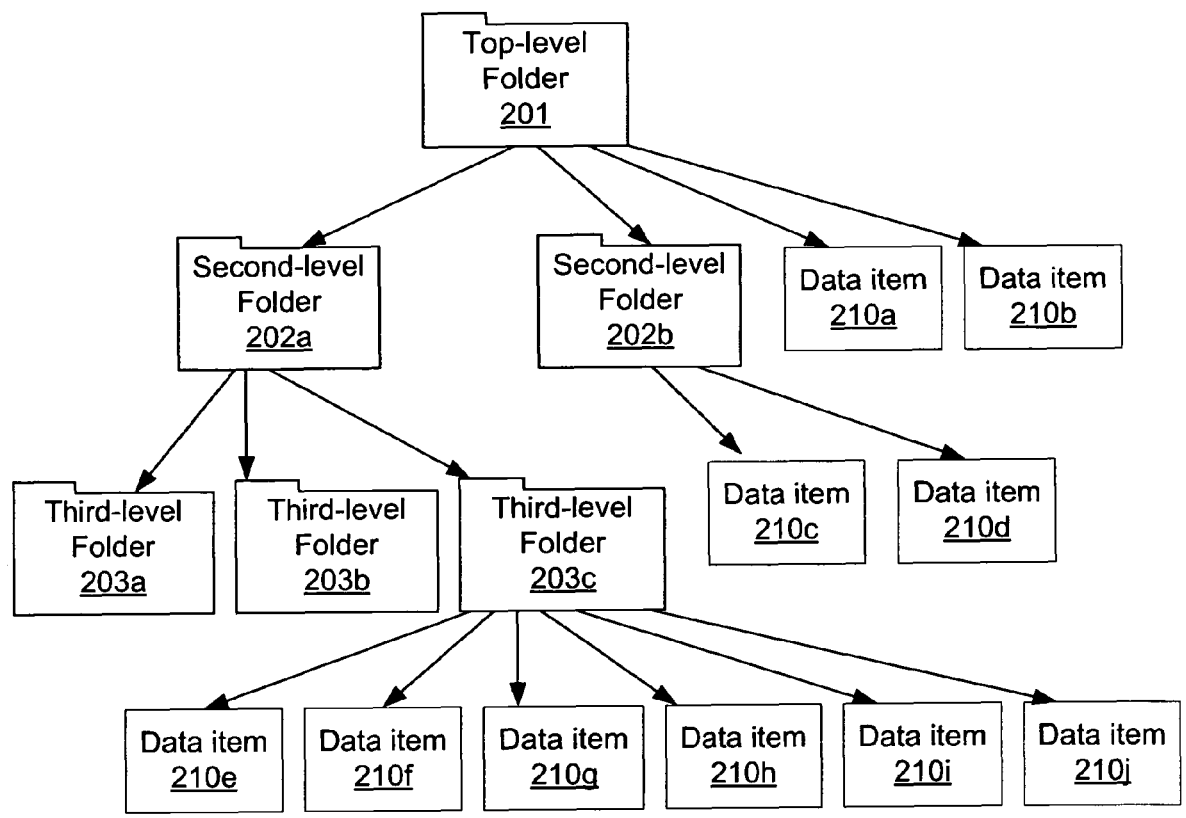
FIG. 2 is a block diagram of a prior art hierarchical system including nested folders and data items.

Many devices and computer systems allow users to store hierarchically a data item collection in which folders can contain sub-folders as well as data items. FIG. 2 is an exemplary depiction of such a collection. As shown in FIG. 2, a top-level folder 201 contains second-level folders 202a and 202b and data items 210a and 210b. Second-level folder 202a contains third-level folders 203a, 203b and 203c. Second-level folder 202b contains data items 210c and 210d. And third-level folder 203c contains data items 210e, 210f, 210g, 210h, 210i, and 210j. As shown, folders may be empty (such as third-level folders 203a and 203b), may contain only data items (second-level folder 202b and third-level folder 203c), contain only folders (second-level folder 202a) or may contain both folders and data items (top-level folder 201). While folders are discussed and shown in FIG. 2, folders can be any grouping, and may be called "collections", "groupings" or otherwise termed. The system may be implemented in many ways, and discussions of a folder (such as second-level folder 202a) being "in" another folder (such as top-level folder 201) do not imply any specific structural or physical containment. Generally, links or lists are used to create such a hierarchical system.

Figure 3:
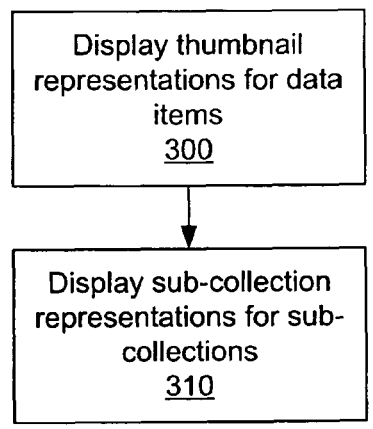
FIG. 3 is a flow diagram of a method for representing a collection of items including sub-collections and data items according to one embodiment of the invention.

FIG. 3 is a flow diagram of a method for representing a collection of items including sub-collections and data items. As shown in FIG. 3, in step 300, individual data items in a collection are displayed by displaying a thumbnail representation for each individual item. In step 310, sub-collections in a collection are displayed by providing a sub-collection representation for each sub-collection. While these steps are shown in FIG. 3 as being performed in series, they may be performed in any order, including at the same time or overlapping in any way.

An individual data item may be an image, in which case the thumbnail representation may be a version of the image sized to fit in a small area. An individual data item may also be, for example, a video file, in which the thumbnail representation may be selected to show what the content of the video file is—for example, a representative still, a still from a title sequence, or a series of representative stills. In the case in which an individual data item is a video file, a clip of the video file may also be used. Generally, the thumbnail representation may be any visual representation derived from the data image which will assist a user in quickly identifying the data item represented. In one embodiment, some textual information is displayed along with the thumbnail representation, either underneath it or, for example, visible in a pop-up box when the user indicates (e.g. through a mouse pointer position) a specific thumbnail.

A sub-collection representation of a sub-collection generally includes text including the name of the sub-collection or any identifying information about the sub-collection which a user may use to distinguish among sub-collections. Other information, such as a number of data items in the sub-collection, date information regarding the sub-collection, or a thumbnail showing one or more representative data items from the sub-collection may also be included.

Figure 4:
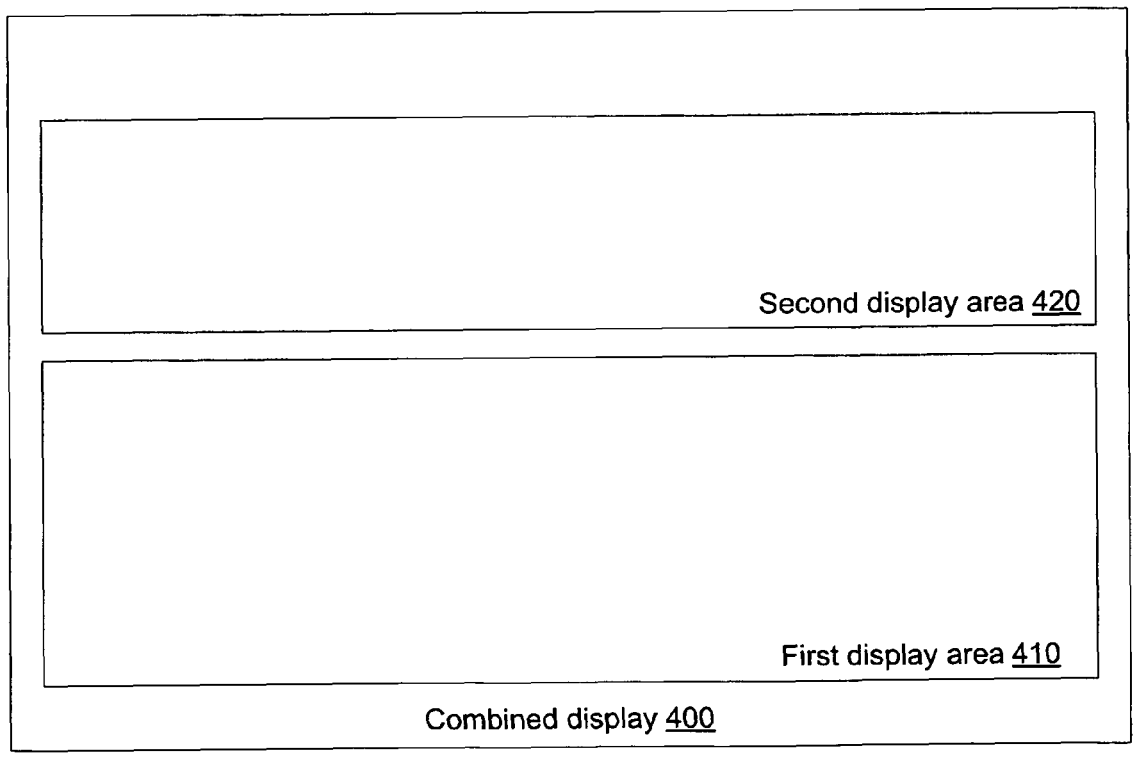
FIG. 4 is a block diagram of a combined display according to some embodiments of the present invention.
Figure 5:
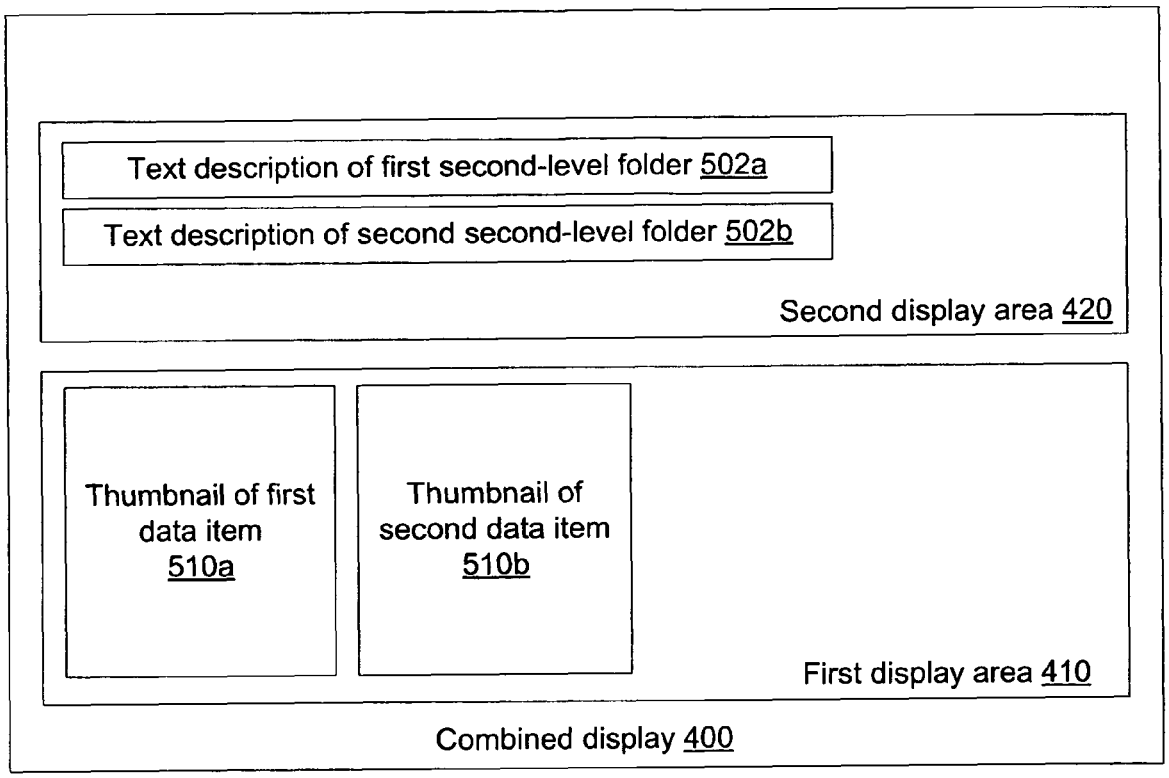
FIG. 5 is a second view block diagram showing an example of a combined display according to some embodiments of the present invention.

FIG. 4 is a block diagram of a combined display according to one embodiment of the present invention. A combined display 400 includes a first display area 410 in which thumbnail representations are displayed, and a second display area 420 in which sub-collection representations are displayed. FIG. 5 is a block diagram showing a combined display displaying the top-level folder 201 of FIG. 2. As shown in FIG. 5, the first display area 410 includes a thumbnail 510a of a first data item (e.g. data item 210a from FIG. 2) and a thumbnail 510b of a second data item (e.g. data item 210b from FIG. 2). Second display area 420 includes a text description 502a of a first second-level folder (folder 202a from FIG. 2) and a text description 502b of a second second-level folder (folder 202b from FIG. 2). Where more data items or sub-collections exist, they are also represented by thumbnails or sub-collection representations. In one embodiment, more data items may be in the collection than are represented by thumbnails in first display area 410 and additional thumbnails may be revealed, for example by scrolling using a scrollbar, by requesting additional thumbnails, or automatically over time. In some embodiments, when more thumbnails are requested, first display area 410 is enlarged to display more thumbnails, with second display area 420 disappearing, being overlapped, or being shrunk to accommodate the additional display. Similarly, more sub-collections than those shown by sub-collection representations in second display area 420 may be present, and a scroll bar, user request, or automatic scrolling (among other behaviors) are used in order to display the additional sub-collection representations.

In some embodiments, the user can select one of the sub-collection representations, and upon such selection, thumbnails corresponding to data images in the sub-collection represented by the sub-collection representation appear in the first display area. In some such embodiments, the second display area 420 displays sub-collection representations of sub-sub-collections (collections contained within the sub-collection—such the relationship that third-level folder 203c has to top-level folder 201 in FIG. 2) in the sub-collection.

In some embodiments, a third display area describes or indicates functionality which can be accessed by a user. For example, a list of functions such as delete, print, display, and edit are listed or otherwise represented (e.g. with icons). In some such embodiments, the functions available for the user are different depending on whether the second display area 420 has been selected by the user or whether the first display area 410 has been selected by the user. Thus, if the second display area 420 has been highlighted or selected (by resting the mouse within the display area, by touching the display area 420 on a touch screen, by selecting a sub-collection representation in the second display area, or in some other way) then a first set of functions are available. Where a third display area indicates available functionality, the third display area shows the available functions for the sub-collections. If the first display area 410 has been selected in a similar manner (e.g. by selecting a thumbnail or selecting the first display area 410 in general) then the third display area shows the available functions for the data items.

In some embodiments, one or more items in the first display area 410 and/or one or more items in the second display area 420 may be selected/highlighted. Such highlighting may cause the display of the highlighted items to appear differently in the combined display 400. Selection of items in this way causes the highlighted items to be acted upon together.

In one embodiment, the items in the first display area 410 or the second display area 420 are sorted in response to a sorting command. Thus, for example, thumbnail images in a first display area 410 are sorted by date, by reverse date, by size, by length (for a video presentation), by source, or otherwise, in response to a sorting command. Similarly, the sub-collection representations in the second display area 420 are sorted in response to a command to sort those sub-collection representations. In one embodiment, a unified sorting command can be issued which sorts both the thumbnail images in the first display area 410 and the sub-collection representations in the second display area 420.

In one embodiment, in addition to a sorting command, a user can access a grouping command and/or a filtering command. A grouping command allows a user to group the images in terms of a group—by month, by folder, or by keyword. The result of a grouping command, in one embodiment, is to provide thumbnail images according to the group specified in the grouping command. Thus, where a grouping command requests images grouped by keyword and each image has been tagged with one or more of five different keywords, the images are displayed in groups, each group representing a specific password. A visual indication of which keyword corresponds to a group may also be provided. In one embodiment, all groups are visible. In another embodiment, thumbnail images for one group are displayed in first display area 410 and sub-collection representations corresponding to the other available groups are displayed in second display area 420. In other embodiments some or all of the grouped images are displayed in a way which makes clear their groupings. Similarly, a filter command may be selected by a user. One or more filtering criteria are associated with a filtering command. In one embodiment, the result of a filtering command is to have only those images which pass the filtering criteria displayed in second display area 420.

Figure 6:
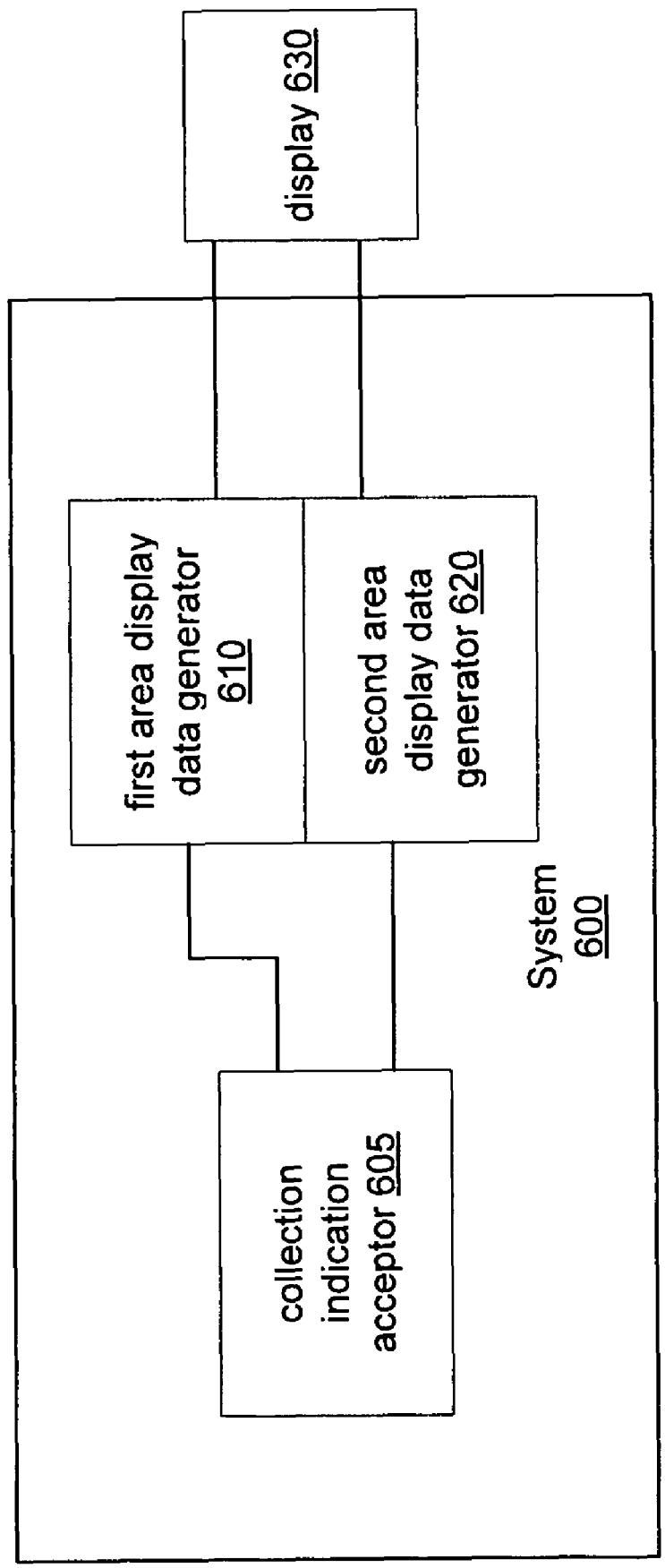
FIG. 6 is a block diagram of a system for generating a display of data items according to some embodiments of the invention.

FIG. 6 is a block diagram of a system for generating a display of data items according to some embodiments of the invention. As shown in FIG. 6, a system 600 includes a collection indication acceptor 605 which accepts an indication of a hierarchical grouping—e.g. a folder/collection described above. As an example, with reference to FIG. 1, this collection indication acceptor 605 may comprise a pointing device 161 or a keyboard 162, along with a user input interface 160. Additionally, with reference again to FIG. 6, a first area display data generator 610 which generates first area display data including a thumbnail image for child data items in the indicated folder. A second area display data generator 620 generates a second area display data including sub-collection representations describing child folders in the indicated folder.

With reference to FIG. 1, in one embodiment, the first area display data generator 610 and the second area display data generator 620 may be implemented in a combination of a system memory 130 and a processing unit 120. In some embodiments, a display 630 (such as monitor 191 from FIG. 1) is also included in the system. In some embodiments an indication acceptor for selecting an item and a function selection acceptor for accepting a function selection are accepted. These are, in one embodiment, implemented with collection indication acceptor 605.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for displaying a data collection organized in a hierarchy containing a plurality of levels, said data collection comprising at least one individual item at a level of the hierarchy and at least one sub-collection at the same level of the hierarchy as the at least one individual item, each sub-collection comprising one or more sub-collection items, said method comprising:

displaying each individual item by displaying a thumbnail representation of said individual item in a thumbnail representation area of a display;

displaying each sub-collection at the same level of the hierarchy as the displayed individual items in a respective sub-collection representation area, each sub-collection representation area displaying data representing a corresponding sub-collection;

in response to a request to display additional thumbnail representations, resizing at least one of the thumbnail representation area of the display and the sub-collection representation area;

in response to a grouping command specifying a group comprising a plurality of images, modifying the display of the at least one individual item to display the at least one individual item as at least one group thumbnail image comprising a composite of a plurality of images in the group specified by the grouping command; and in response to a unified sorting command, modifying the display of the at least one individual item to display the at least one individual item in sorted order and modifying the display of the sub-collection representation area to display the at least one sub-collection in sorted order.

2. The method of claim 1, wherein said display of said at least one individual item occurs in a first area of a display, and wherein said display of said at least one sub-collection occurs in a second area of the display.

3. The method of claim 2, further comprising:
accepting a user selection of one of said thumbnail representations or one of said sub-collection representation areas.

4. The method of claim 3, wherein the user selection of one of said sub-collection representation areas corresponding to a specific sub-collection causes at least one sub-collection item thumbnail to be displayed in the first area of the display, each sub-collection item thumbnail corresponding to a sub-collection item in said specific sub-collection.

5. The method of claim 1, further comprising:
displaying at least one function description corresponding to functionality which can be accessed by a user.

6. The method of claim 5, further comprising:
accepting a user selection of one of said thumbnail representations or one of said sub-collection representation areas.

7. The method of claim 6, wherein said function descriptions displayed change based on whether said user selection is of one of said thumbnail representations or is of one of said sub-collection representation areas.

8. The method of claim 1, further comprising:
accepting a grouping command from a user; and
modifying said display of said individual items according to said grouping command.

9. A computer-readable storage medium comprising computer-executable instructions for displaying a collection of data items organized in a hierarchy containing a plurality of levels, said collection comprising at least one individual item and at least one sub-collection item at a same level of the hierarchy as the at least one individual item, each sub-collection comprising one or more sub-collection data items, said computer-executable instructions for performing steps comprising:

displaying in a first area of a display a graphical representation corresponding to each of said individual items;

displaying in a second area of the display a sub-collection representation item corresponding to each of said sub-collection items that is at the same level of the hierarchy as the displayed individual items;

displaying in a third area of the display functionality selection data for selecting functionality that can be performed on a data item;

in response to a request to display additional graphical representations of individual items, resizing at least one of the first, second, and third areas of the display;

in response to a grouping command specifying a group corresponding to a selected keyword, modifying the display of the at least one individual item to display the at least one individual item as at least one group thumbnail image representative of the group specified by the grouping command, the at least one group thumbnail image comprising a visual indication of the keyword corresponding to the group specified by the grouping command; and in response to a unified sorting command, modifying the display of the at least one individual item to display the at least one individual item in sorted order and modifying the display of the sub-collection representation area to display the at least one sub-collection in sorted order.

10. The computer-readable storage medium of claim 9, said steps further comprising:
accepting a user browsing command indicating a user selection of one of said graphical representations or one of said sub-collection representation items; and
highlighting said selected graphical representation or said selected sub-collection representation item.

11. The computer-readable storage medium of claim 9, wherein said functionality selection data is different if a sub-collection representation item is highlighted than it is if a graphical representation is highlighted.

12. The computer-readable storage medium of claim 9, said steps further comprising:
accepting a user selection indication selecting one of said graphical representations or said sub-collection representation items, and performing an action on said data item corresponding to said selected graphical representation or said selected sub-collection representation item.

13. The computer-readable storage medium of claim 12, said steps further comprising:
displaying, if said user selection indicates a sub-collection representation item corresponding to a specific sub-collection, at least one sub-collection data items from said specific sub-collection.

14. The computer-readable storage medium of claim 9, said steps further comprising:
accepting a sorting command from a user; and
modifying said display of said graphical representations according to said sorting command.

15. A system for generating a display of data items stored in hierarchical groupings, each hierarchical grouping comprising at least one child data item or one child hierarchical grouping, said system comprising:
a processor;
a memory;
a collection indication acceptor for accepting an indication of a selected hierarchical grouping;
a first area display data generator operably connected to said collection indication acceptor, said first area display data generator for generating first area display data, said first area display data comprising at least one thumbnail image, each thumbnail image corresponding to a child data item in a level of said selected hierarchical grouping; and
a second area display data generator operably connected to said collection indication acceptor, said second area display data generator for generating second area display data, said second area display data comprising at least one sub-collection representation item, each sub-collection representation item corresponding to a child hierarchical grouping at the same level in said selected hierarchical grouping as the child data item,
wherein the first area display data and the second area display data are displayed in respective first and second display areas, at least one of the first and second display areas being resized in response to a request to display additional thumbnail images, wherein, in response to a grouping command specifying a group comprising a plurality of images, the first area data generator generates a revised first area display data, said revised first area display data comprising at least one group thumbnail image comprising a composite of the plurality of images in the group specified by the grouping command, and wherein, in response to a unified sorting command, the first area display data generator modifies the first area display data such that the at least one thumbnail image is displayed in sorted order and the second area display data generator modifies the second area display data such that the at least one sub-collection representation item is displayed in sorted order.

16. The system of claim 15, further comprising:

a display, operably connected to said first area display data generator and said second area display data generator, displaying said first area display data and said second area display data.

17. The system of claim 15, further comprising:

an item indication acceptor, operably connected to said first area display data generator and said second area display data generator, said data item indication acceptor for accepting an item indication of one of said thumbnail images or one of said sub-collection representation items;

a function selection acceptor, operably connected to said data item indication acceptor, for accepting an indication of a function from among a set of possible functions to perform, wherein said a first set of possible functions is selected from if said item indication indicates one of said thumbnail images, wherein a second set of possible functions is selected from if said item indication indicates one of said sub-collection representation items, and wherein said first set of possible functions and said second set of possible functions are not identical.

18. The system of claim 17, wherein, when the function selection acceptor selects a sorting command, said first area data generator generates a revised first area display data, said revised first area display data comprising said thumbnail images sorted according to said sorting command.

* * * * *